March 6, 1962 P. R. GOUDY ET AL 3,024,337

SWITCH ENCLOSURE

Filed June 25, 1959 3 Sheets-Sheet 1

INVENTORS
Paul R Goudy
Joseph J. Gribble, and
Kenneth J. Marien

BY Clyde H Haynes
their atty

March 6, 1962 P. R. GOUDY ET AL 3,024,337

SWITCH ENCLOSURE

Filed June 25, 1959 3 Sheets-Sheet 2

INVENTORS

BY

March 6, 1962 P. R. GOUDY ET AL 3,024,337

SWITCH ENCLOSURE

Filed June 25, 1959 3 Sheets-Sheet 3

INVENTOR.

Paul R. Goudy
Joseph J. Gribble, and
BY Kenneth J. Marien

Clyde H. Haynes
their atty

United States Patent Office 3,024,337
Patented Mar. 6, 1962

3,024,337
SWITCH ENCLOSURE

Paul R. Goudy, Joseph J. Gribble, and Kenneth J. Marien, Milwaukee, Wis., assignors to Square D Company, Detroit, Mich., a corporation of Michigan
Filed June 25, 1959, Ser. No. 822,840
12 Claims. (Cl. 200—168)

This invention relates to enclosures for switches and more in particular to fluidproof and dust-tight enclosures or boxes which may be securely locked to prevent unauthorized operation, as well as the authorized operation, of push buttons on a switch in the enclosure.

One of the primary requisites of a dust-tight and fluidproof switch enclosure is that it be completely dust-tight and fluidproof, even when the enclosure is for push button operated switches wherein the push buttons are engageable through the cover of the enclosure by an operator. Another requirement of such enclosures is the safety feature wherein it is impossible for anyone to poke a screw driver or other piece of metal past the push button and through the opening in the enclosure through which the push button is pressed. The safety feature has been easily provided in enclosures which are not fluidproof or dust-tight by simply having the holes through which the push button extends in the enclosure nearly the same size as the push button so that there is no room to insert an object between the push button and the edge of the opening. One of the real problems in designing a fluid-tight enclosure is that of preventing fluid going through the opening through which the push button extends, or through which the push button is operated. In addition to this problem is the further problem of rendering the push button inaccessible or inoperative.

It is thus apparent that one of the major objects of the present invention is to overcome the aforementioned problems and deficiencies in prior structures.

Another object of the present invention is to provide a push button operated switch and enclosure which is fluid-tight.

Another object of the present invention is to provide a push button operated switch and enclosure which is fluid-tight and structure is provided to prevent unauthorized operation of the push buttons.

A further object of the invention is to provide a switch box enclosure having an opening through which the push button may be operated and a flexible diaphragm covering that opening and held in place by a retainer plate with a button guard which fits entirely around the push button to prevent insertion of any object from externally of the switch box past the pushbutton and into the box and a door-like member which is slidably mounted to cover the diaphragm and be locked in that diaphragm covered position to prevent unauthorized operation of the push button by flexing the diaphragm.

Other objects and a fuller understanding of this invention may be had by referring to the following description and claims, taken in conjunction with the accompanying drawings in which:

Figure 1:
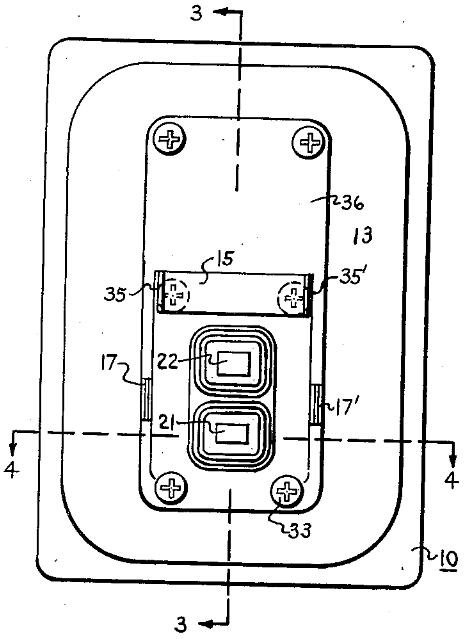
FIGURE 1 is a front elevational view of a switch enclosure incorporating the features of the invention.

The following description, the attached drawings, and the accompanying claims jointly set forth one or more modifications incorporating the present invention and the advancement in the art of making foreign-matter tight and lockable enclosures for push button switches. As used throughout the present description and claims, the terms fluid-tight, dust-tight and other similar terms which impart the idea of the box being sealed against the entry of foreign matter of either a gaseous, fluid or solid state are to be interpreted in their broad sense wherein water and dust are specific examples of the most common foreign matter which must be excluded from the box.

The drawings illustrate a switch comprising an enclosure or box 10 which houses a switch having, in this instance, push buttons 11 and 12 adapted to be manually pushed or otherwise moved relative to the enclosure to operate the switch enclosed therein. The enclosure 10 includes a front wall 13 extending in a plane transverse to the line of movement of the buttons 11 and 12. This front wall 13 is provided with an opening enclosed or sealed off by a diaphragm 14 aligned for engagement with the push buttons 11 and 12. Unauthorized operation or movement of the buttons 11 and 12 is prevented by a slide 15 mounted in a housing 16. The slide is movable in opposite directions parallel to front wall 13 between unlock position (FIG. 1) wherein the slide is free of the buttons and a lock position (FIG. 2) wherein the slide interferes with operation of the push buttons. The housing 16 has spaced lock receiving ears 17 and 17′ on one end thereof.

Inadvertent or mischievous insertion of a screw driver, or other pointed tool or object which is used to puncture the diaphragm 14 and extend past push buttons 11 and 12 is prevented by a barrier 18 which is secured on the inside of the front wall 13. This barrier forms a wall through which push buttons 11 and 12 operatively extend. Further explanation of the cooperation of the parts will be made following the complete description of each individual part.

Figure 5:
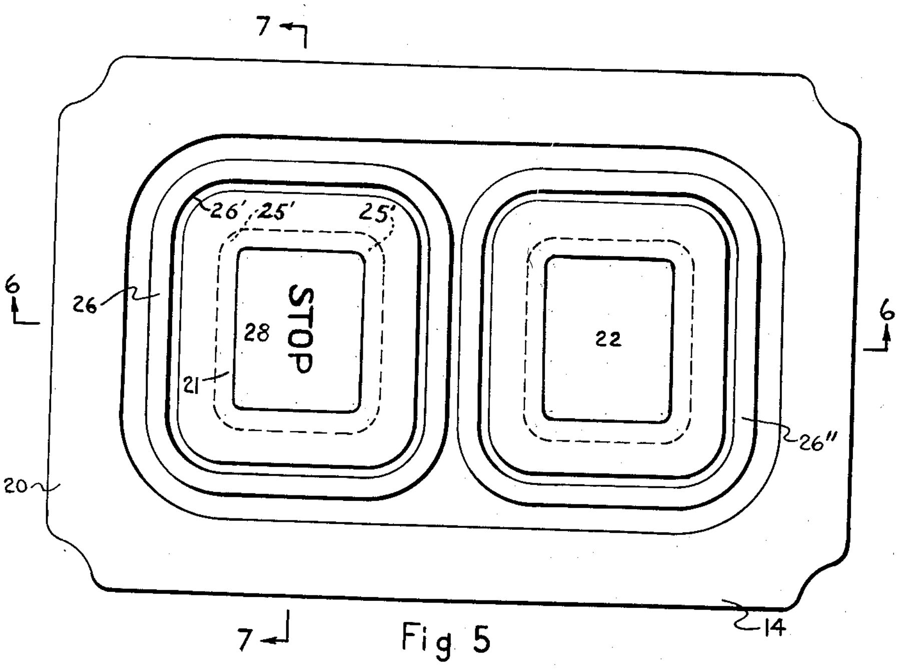
FIGURE 5 is a plan view of the flexible diaphragm.
Figure 6:
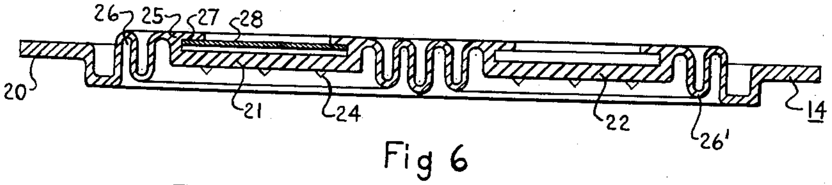
FIGURE 6 is a sectional view taken along the line 6—6 of FIGURE 5.
Figure 7:
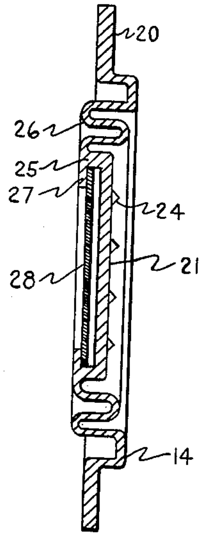
FIGURE 7 is a sectional view taken along the line 7—7 of FIGURE 5.

The details of construction of diaphragm 14 are best illustrated in FIGURES 5, 6 and 7. In this instance diaphragm 14 is illustrated for use on an enclosure for a switch which has two push buttons, namely buttons 11 and 12. It is understood that the features of the present invention may be applied for diaphragms used on enclosures for switches having more or less than two push buttons. In actual practice diaphragm 14 may be constructed from molded silicone rubber or some other similar moldable material which is flexible. As illustrated, diaphragm 14 has a planar periphery portion 20 bounding button engageable portions 21 and 22. The periphery portion 20 is in sealing contact with the inner surface of front wall 13. The button engageable portions 21 and 22 are spaced apart the same spacing as the push buttons 11 and 12 so that each will engage its respective of the push buttons when the enclosure is completely assembled. In this instance button engageable portion 21 is in the form of a flat rectangular shaped portion and has nibs 24 on the surface which engages the buttons 11 or 12. Button engageable portion 21 is preferably disposed in a plane parallel to the plane of planar periphery portion 20 and the entire diaphragm 14 is constructed of a single piece of flexible material. Extending outwardly from the periphery of button engageable portion 21 is a wall portion 25 which is integrally joined to planar periphery portion 20 by one or more corrugations 26. Extending inwardly of button engageable portion 21 from wall portion 25 is flange portion 27 which overlies a part of the surface of button engageable portion 21 to retain an identification name plate 28, insertable between flange portion 27 and button engageable portion 21.

As further illustrated in FIGURES 5, 6, and 7 button engageable portion 21 is substantially rectangular with wall portion 25 extending peripherally therearound in such manner that wall portion 25 has opposing straight parallel side wall portions and opposing straight parallel end wall portions, all of which are interconnected with rounded corners, for example corner 25'. The corners 25' are sufficiently rounded so that an imaginary circle, superimposed on any one of the corners with the circle lying on either the inside or outside surface thereof, will have its center within the area of the button engageable portion and thus within the confines of wall portion 25.

Similarly, the corrugations 26 extend parallel with the wall portions 25 and have rounded corners, for example rounded corner 26', of a radius wherein an imaginary circle, superimposed on any one of the corners 26' has its center within the area of the button engageable portion 21, and preferably at the near corner 25' of wall portion 25. It is further noted that each corrugation 26 has a height in a direction transverse with the planes of the peripheral wall 20 and the button engageable portion 21 greater than its width in the direction of those planes. In this way the corrugation 26 may be said to include a plurality of parallel ribs, each of which extends around the button portion and normally stays in a relaxed position. The thickness of the ribs and thus of the corrugations 26 is less than the thickness of the finger engageable portion 21 and the wall portion 20. Because of this, the corrugations 26 are easily deflected from their relaxed position as illustrated in the drawings to their unrelaxed position during operation and movement of the push buttons, but will return to the relaxed position, as illustrated upon release of pressure thereagainst and in the direction of movement of the push buttons.

Button engageable portion 22 will not be further described since it may be similar or identical to button engageable portion 21. It is noted that, in this instance, planar periphery portion 20 does not extend between button engageable portions 21 and 22 and thus the corrugations 26, which extend completely around button engageable portion 21, and similar corrugations 26', which extend completely around button engageable portion 22, are disposed side by side in the middle of diaphragm 14 and between button engageable portions 21 and 22.

Figure 3:
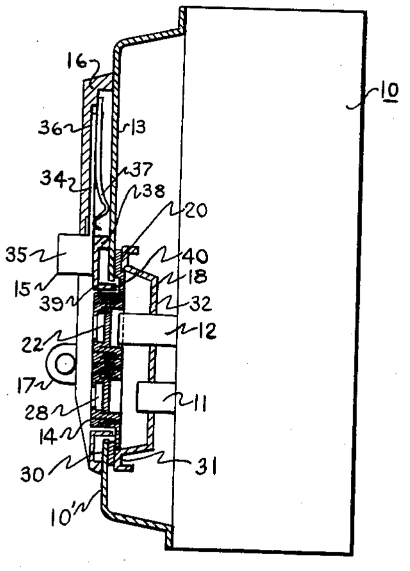
FIGURE 3 is a sectional view taken along the line 3—3 of FIGURE 1.
Figure 4:
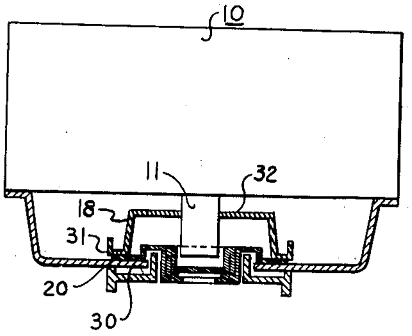
FIGURE 4 is a sectional view taken along the line 4—4 of FIGURE 1.

As illustrated in FIGURES 1, 3 and 4 the opening in front wall 13 is greater in area than the combined areas of button engageable portions 21 and 22 plus the space required for corrugations 26 and 26'. Thus front wall 13 has an edge 30, which is disposed around the opening and which engages the periphery 20 of diaphragm 14. Planar periphery portion 20 is held against edge 30 by barrier 18, which has a shoulder 31 engaging planar periphery portion 20. As illustrated, barrier 18 is somewhat pan shaped to provide a barrier wall 32 disposed in a plane parallel to the plane of shoulder 31 or front wall 13 and at a distance from diaphragm 14 when diaphragm 14 is in its relaxed position as illustrated in FIGURE 3. Shoulder 31, planar periphery portion 20 and edge 30 may be held tightly together so that fluid, dust or foreign matter cannot pass between edge 30 and planar periphery portion 20 by means of screws 33, or other suitable means.

When an operator presses his finger against name plate 28, and therethrough button engageable portion 21, he will depress it towards push button 11 until button engageable portion 21 engages push button 11. Further pressing of the finger will cause flexing of the diaphragm 14 and movement of push button 11 to the position illustrated in FIGURE 3. It is noted that sufficient space is provided between front wall 13 and barrier wall 32 of barrier 18 to permit corrugations 26 to flex so that name plate 28 can be moved until button 11 operates the switch. Nibs 24, which are on the side of button engageable portion 21 which engages push button 11, prevent button engageable portion 21 from sticking to push button 11, thereby allowing diaphragm 14 to return to its relaxed position as illustrated upon removal of pressure against portion 21.

As was previously described, slide 15 is mounted within housing 16 and is slidable over and in front of diaphragm 14 to prevent unauthorized operation of push buttons 11 or 12. Slide 15 is constructed from a flat plate of sheet material and is provided with a pair of wings 35 and 35' on one end thereof. These wings extend outwardly from front wall 13 and the plate portion 34 of slide 15. Housing 16 has a front wall 36 normally enclosing plate portion 34. Mounted on the inside of front wall 36 and positioned between front wall 36 and front wall 13 is a spring clip 37 which frictionally holds plate portion 34 against front wall 36 to prevent plate portion 34 inadvertently sliding downwardly in FIGURE 1 and over top of diaphragm 14 to the position illustrated in FIGURE 2.

Spaced from front wall 36 and engaging front wall 13 is a portion 38 which is an integral portion of and extends from one side to the other side of housing 16. Portion 38 has a top surface 39 and is aligned with spring clip 37 to cause plate portion 34 to slide between top surface 39 and front wall 36 when it slides into and out of housing 16. Top surface 39 is spaced from front wall 13 a distance sufficient to prevent slide 15 from cutting into diaphragm 14. At the same time portion 38 has a wall portion 40 extending into the opening in front wall 13 and thereby engageable with planar periphery portion 20 to form a neat appearance around corrugations 26 and to prevent easy access to edge 30. In actual practice some of the screws 33 may be inserted through portion 38 as well as edge 30, planar periphery portion 20 and shoulder 31 to hold all of these parts together.

Figure 2:
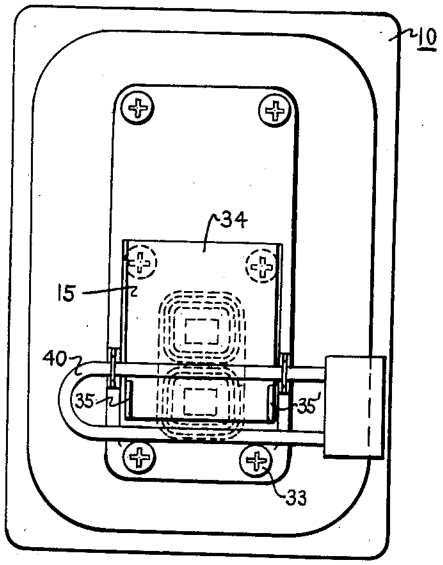
FIGURE 2 is a view similar to FIGURE 1 by showing the switch locked against unauthorized operation.

When it is desired to prevent unauthorized operation of the push buttons, slide 15 is slid from its unlock position in FIGURE 1 wherein it is within housing 16 and to its lock position in FIGURE 2 wherein it covers or extends over top of diaphragm 14 and until wings 35 and 35' pass receiving ears 17 and 17'. It is noted that wings 35 and 35' and receiving ears 17 and 17' extend outwardly from front wall 13 approximately the same distance so that at least one hasp 40 of at least one lock may be inserted through receiving ears 17 and 17' to prevent movement of slide 15 to its unlock position of FIGURE 1 wherein it is under front wall 36. For purposes of illustration the hasp which engages receiving ears 17 has been extended into receiving ears 17' even though the ears 17 and 17' are spaced apart so that individual padlocks can be used with each respective ear. When slide 15 is in the unlock position of FIGURE 1, wherein plate portion 34 is under front wall 36, wings 35 and 35' are on one side of receiving ears 17 and 17' and when slide 15 is in the lock position of FIGURE 2, wherein plate portion 34 covers diaphragm 14, wings 35 and 35' are on the opposite side of receiving ears 17 and 17'.

Figure 8:
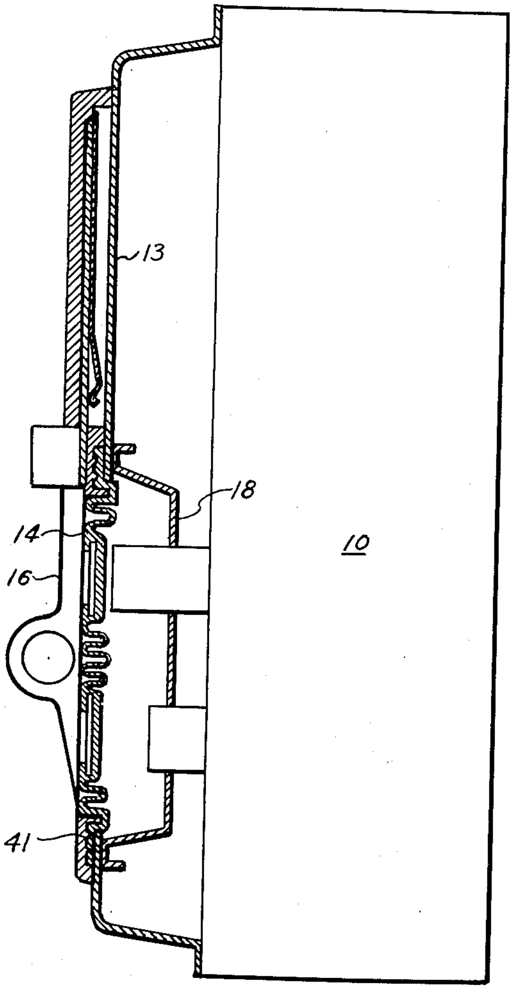
FIGURE 8 is a view similar to FIGURE 3 but showing an alternate construction incorporating the features of the invention.

An alternate construction using the same parts as used in the FIGURES 1 to 4 is illustrated in FIGURE 8 with the parts having the same number and reference character as they have in the other figures. The structure in FIGURE 8 differs from that of FIGURES 1 to 4 by having the diaphragm seated against the outer surface of the front wall 13 instead of against the inner face thereof. When the diaphragm 14 is seated against the outer surface of the front wall 13, the peripheral edge thereof is positioned between the housing 16 and the front wall 13 whereas when the diaphragm 14 is placed against the inner surface of the front wall 13, it is positioned between the barrier 18 and the front wall 13. FIGURE 8 also illustrates the addition of ridges, such for example ridge 41, on the undersurface of the housing 16 and which bite into the peripheral edge of the diaphragm 14. These ridges 41 are used to increase the holding power and to prevent the diaphragm from easily pulling out from between the housing 16 and the front wall 13. It is noted that the peripheral edge of the resilient of flexible diaphragm 14 also serves the purpose of a gasket between housing 16 and front wall 13 to prevent leakage of moisture there between and into the enclosure.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An enclosure for a push button switch having at least a push button movable between spaced limits in a line of movement, said enclosure including: a front wall disposed beyond the limits in a plane transverse to said line of movement and having an opening through which the push button may be operated, flexible diaphragm means sealing said opening and having a button engaging portion normally extending in the plane of the front wall means and flexibly movable out of said plane between the limits during operation of said push button, barrier means disposed beyond the limits in a plane spaced from and parallel to said front wall, said barrier means having an opening through which said push button extends with the side of said opening in the barrier means being approximately equal to and slightly greater than the push button to thereby safely prevent insertion of an object through the opening in said barrier means when the object has punctured the diaphragm, and a peripheral portion integrally formed on the diaphragm surrounding the button engaging portion providing a gasket between the inner surface of the front wall and the barrier means.

2. The structure as defined in claim 1 wherein said button engageable portion is rectangular and has rounded corners, said corrugations extending parallel with the peripheral portions and having rounded corners with the center of a circle superimposed on any one of the rounded corners being disposed within the area of the button engageable portion.

3. The structure as defined in claim 1 wherein said button engageable portion has a plurality of spaced nibs on the side thereof engageable with said button to maintain minimum surface area contact between the button engageable portion and the surface of the button thereby preventing sticking of the diaphragm to the button.

4. The structure of claim 1 wherein there are a plurality of corrugations interjoining said portions.

5. The structure as defined in claim 1 wherein said button engageable portion is provided with peripheral wall means extending outwardly therefrom on one side thereof and terminating in an inwardly directed flange extending inwardly thereover towards the center of said button engageable portion and name plate means identifying the button which will be engaged by said button engageable portion upon operation thereof is disposed next adjacent said button engageable portion and between the button engageable portion and the flange means and within the boundaries of the peripheral wall means.

6. An enclosure for a push button switch having at least a push button movable in a line of movement, said enclosure including a front wall provided with an external surface transverse to said line of movement and provided with an opening through which the push button may be operated, means secured to said front wall and having portions next adjacent said external surface and extending alongside said buttons, and a cover plate slidable along said portions from an unlock position wherein said cover plate is removed from interfering with operation of said buttons to a lock position wherein said cover plate covers and thereby interferes with operation of said buttons, said cover plate and said means having cooperative locking means alignable when the plate is in said lock position to prevent movement of said cover plate to its unlock position, resilient means carried by said means for maintaining the cover plate in the unlock position and a diaphragm positioned in said opening and having a peripheral portion providing a gasket between said external surface and said means for sealing said opening and a button engaging portion normally extending in the plane of the front wall and flexibly movable out of said plane during operation of the push button.

7. The structure of claim 6 wherein there are a plurality of corrugations interjoining said portions.

8. The structure as defined in claim 6 wherein said button engageable portion is provided with peripheral wall means extending outwardly therefrom on one side thereof and terminating in an inwardly directed flange extending inwardly thereover towards the center of said button engageable portion, and name plate means identifying the button which will be engaged by said button engageable portion upon operation thereof is disposed next adjacent said button engageable portion and between the button engageable portion and the flange means and within the boundaries of the peripheral wall means.

9. The structure as defined in claim 6 wherein said button engageable portion has a plurality of spaced nibs on the side thereof engageable with said button to maintain minimum surface area contact between the button engageable portion and the surface of the button thereby preventing sticking of the diaphragm to the button.

10. The structure as defined in claim 6 wherein said button engageable portion is substantially rectangular and has rounded corners, said corrugations extending parallel with the peripheral portions and having rounded corners with the center of a circle superimposed on any one of the rounded corners being disposed within the area of the button engageable portion.

11. An enclosure for a push button switch having at least a push button movable in a line of movement, said enclosure including front wall means disposed in a plane transverse to said line of movement and provided with an opening through which the push button may be operated, flexible diaphragm means sealing said opening and normally extending in the plane of the front wall means and flexibly movable out of said plane during operation of said push button, barrier means disposed in a plane spaced from and parallel to said front wall, said barrier means having an opening through which said push button extends with the size of said opening in the barrier means being approximately equal to and slightly greater than the push button to thereby safely prevent insertion of an object through the opening in said barrier means after the object has punctured the diaphragm, housing means secured to said front wall means and having wall means spaced from said front wall and having side portions extending one on each side of said diaphragm, lock receiving means on each of said side portions, and cover plate means slidable into said housing and between said side portions from an unlock postion removed from said diaphragm to a lock position covering said diaphragm, said cover plate means having means alignable with said lock receiving means when the plate is in said lock position to prevent movement of said cover plate means to its unlock position when the hasp of a lock is engaged with said lock receiving means and resilient means disposed within the housing means for resiliently maintaining the cover plate in the unlocked position.

12. An enclosure for a push button switch having at least a push button movable between spaced limits in a line of movement, said enclosure including front wall means disposed in a plane transverse to said line of movement and beyond said limits and provided with an opening through which the push button may be operated, flexible diaphragm means sealing said opening and normally extending in the plane of the front wall means and having a button engaging portion flexibly movable out of said plane between the spaced limits during operation of said push button, said diaphragm means including, a peripheral supporting portion, and at least one corrugation extending about said button engageable portion and integrally interjoining said button engageable portion with said peripheral supporting portion to permit flexing of said button engageable portion out of the plane of said peripheral supporting portion and to return the button engageable portion to the plane of the peripheral supporting portion upon removal of pressure thereagainst, said corrugation extending parallel with the peripheral supporting portion and having rounded corners with the center of a circle superimposed on any one of the rounded corners being disposed within the area of the button engageable portion, said button engageable portion being substantially rectangular and having rounded corners and being provided with peripheral wall means extending outwardly therefrom on one side thereof and terminating in an inwardly directed flange extending thereover towards the center of said button engageable portion, said button engageable portion having nibs on the side thereof engageable with said button to maintain minimum surface area contact between the button engageable portion and the surface of the button thereby preventing sticking of the diaphragm of the button, name plate means capable of identifying the button which will be engaged by said button engageable portion upon operation thereof carried by the diaphragm means and disposed next adjacent said button engageable portion and between the button engageable portion and the flange means and within the boundaries of the peripheral wall means, barrier means disposed in a plane spaced from and parallel to said front wall means and beyond the limits of said line of movement and having an opening through which said push button extends with the size of said opening in the barrier means being approximately equal to and slightly greater than the push button to thereby safely prevent insertion of an object alongside said push button and through the opening in said barrier means after the object has punctured the diaphragm means, cover support means secured to said front wall means and having wall means spaced from said front wall means and having side portions extending one on each side of said diaphragm means, lock receiving means on each of said side portions, and cover means slidable between said wall means and said front wall means and between said side portions from an unlock position removed from said diaphragm to a lock position covering said diaphragm means, spring means interassociated with said cover support means and said cover means to retain said cover means in said unlock position when the cover means is moved thereto, said cover means having means alignable with said lock receiving means when the cover is in said lock position to prevent movement of said cover means to its unlock position when the hasp of a lock is engaged with said lock receiving means.

References Cited in the file of this patent

UNITED STATES PATENTS

| | | |
|---|---|---|
| 1,305,998 | Fromager et al. | June 10, 1919 |
| 1,687,199 | Getchell | Oct. 9, 1928 |
| 2,265,438 | Marple | Dec. 9, 1941 |
| 2,436,958 | Eisenberg | Mar. 2, 1948 |
| 2,750,480 | Freeman | June 12, 1956 |
| 2,769,882 | Vitus et al. | Nov. 6, 1956 |

FOREIGN PATENTS

| | | |
|---|---|---|
| 639,129 | Germany | Nov. 28, 1936 |
| 713,200 | Germany | Oct. 9, 1941 |
| 871,287 | France | Jan. 10, 1942 |
| 223,140 | Switzerland | Aug. 31, 1942 |
| 620,961 | Great Britain | Apr. 1, 1949 |
| 1,049,465 | Germany | Jan. 29, 1959 |